United States Patent
Tada (10) Patent No.: US 8,149,469 B2
(45) Date of Patent: Apr. 3, 2012

(54) IMAGE READING APPARATUS AND IMAGE READING METHOD

(75) Inventor: Satoshi Tada, Nishitokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 878 days.

(21) Appl. No.: 12/183,511

(22) Filed: Jul. 31, 2008

(65) Prior Publication Data
US 2009/0034025 A1    Feb. 5, 2009

(30) Foreign Application Priority Data

Aug. 3, 2007   (JP) ................................. 2007-203402
Jul. 18, 2008   (JP) ................................. 2008-187914

(51) Int. Cl.
*H04N 1/32* (2006.01)
*H04N 1/41* (2006.01)

(52) U.S. Cl. .............. 358/426.01; 358/513; 358/514; 358/426.07; 382/232; 382/239; 375/240.25; 375/240.22

(58) Field of Classification Search .......... 358/514, 358/513, 516, 494, 1.16, 520, 523, 426.01, 358/426.07; 382/232–253; 375/240.25, 375/240.23, 240.22, E7.188
See application file for complete search history.

(56) References Cited

U.S. PATENT DOCUMENTS

| | | | | |
|---|---|---|---|---|
| 4,360,840 A * | 11/1982 | Wolfrum et al. | ......... | 358/426.12 |
| 4,571,634 A * | 2/1986 | Caneschi et al. | ......... | 358/426.07 |
| 4,843,389 A * | 6/1989 | Lisle et al. | ..................... | 341/106 |
| 5,398,066 A * | 3/1995 | Martinez-Uriegas et al. | ........................ | 375/240.25 |
| 5,412,427 A * | 5/1995 | Rabbani et al. | ............ | 348/394.1 |
| 5,517,246 A * | 5/1996 | Suzuki | ........................ | 348/412.1 |
| 5,638,498 A * | 6/1997 | Tyler et al. | ................... | 358/1.18 |
| 5,710,719 A * | 1/1998 | Houle | ............................ | 382/232 |
| 5,796,872 A * | 8/1998 | Shimomura | ................... | 382/237 |
| 6,091,778 A * | 7/2000 | Sporer et al. | .................. | 375/240 |
| 6,628,718 B1 * | 9/2003 | Niwamoto | ............... | 375/240.23 |
| 6,961,474 B1 * | 11/2005 | Hirano et al. | ................. | 382/246 |
| 7,039,241 B1 * | 5/2006 | Van Hook | ..................... | 382/232 |
| 7,092,965 B2 * | 8/2006 | Easwar | ................................. | 1/1 |
| 7,369,270 B1 * | 5/2008 | Silverbrook et al. | .......... | 358/1.9 |
| 7,693,393 B2 * | 4/2010 | Ohnishi | ......................... | 386/270 |
| 7,822,277 B2 * | 10/2010 | Aleksic | ......................... | 382/232 |
| 7,916,952 B2 * | 3/2011 | Demos | .......................... | 382/232 |
| 2008/0137751 A1 * | 6/2008 | Roman | ..................... | 375/240.21 |
| 2008/0260276 A1 * | 10/2008 | Yamatani et al. | ............. | 382/249 |
| 2008/0273803 A1 * | 11/2008 | Gough et al. | ................. | 382/233 |

FOREIGN PATENT DOCUMENTS

JP    7-298266 A    11/1995

* cited by examiner

*Primary Examiner* — Negussie Worku (74) *Attorney, Agent, or Firm* — Canon U.S.A., Inc. IP Division (57) ABSTRACT

An image reading apparatus has an image sensor in which a plurality of sensor arrays for reading a document image are connected into a line, and parallel-output image data. In the image reading apparatus, of image data output from each sensor array, image data of a pixel at one end and image data of the remaining pixels are compressed by different compression methods. The compressed data of one line are decompressed by a set method at the timing when the number of pixels reaches a preset number of pixels.

7 Claims, 6 Drawing Sheets

FIG. 1

FIG. 2A
<CASE WHERE COMPRESSION PROCESS IS PERFORMED>

FIG. 2B
<CASE WHERE DECOMPRESSION PROCESS IS PERFORMED>

IMAGE READING APPARATUS AND IMAGE READING METHOD

BACKGROUND OF THE INVENTION

1. Field of the Invention

The present invention relates to an image reading apparatus and image reading method for reading a document image.

2. Description of the Related Art

A general image reading apparatus reads an image by controlling the light source formed from an LED or the like to irradiate a document to be read with light, photoelectrically converting reflected light from the document by a line image sensor made up of a plurality of elements, and storing charges. While scanning a document, the line image sensor having a length corresponding to the document width reads an image line by line. Image data of one line obtained by reading an image of one line are processed for each pixel from image data of a pixel read by an element of the sensor at one end.

Figure 6:
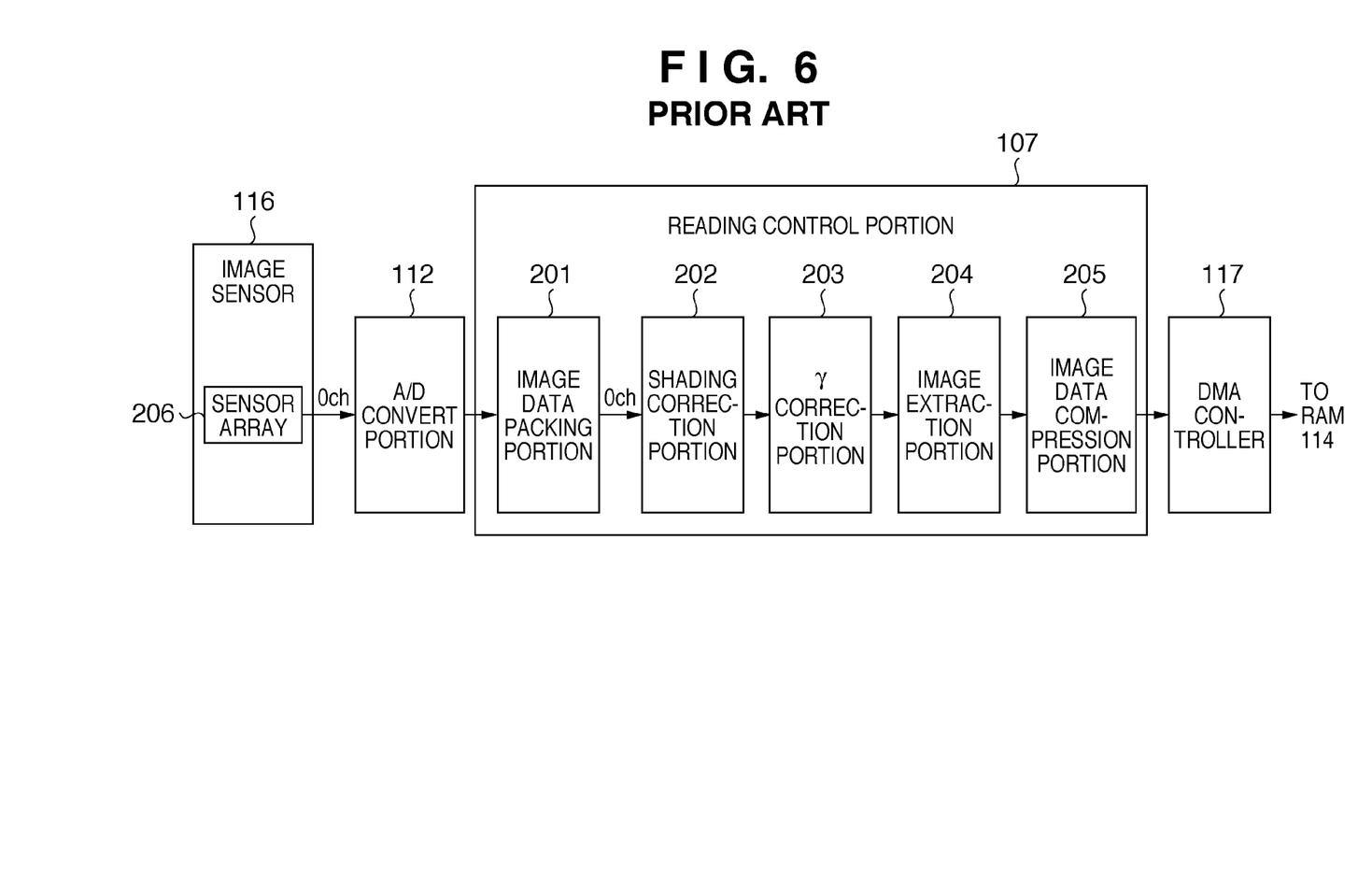
FIG. 6 is a block diagram showing the flow of image data in the reading control portion of a conventional image reading apparatus.

FIG. 6 is a block diagram for explaining the sequence of processes executed for image data of one pixel. Image data of a 1-line image read by an image sensor 116 are serially transferred for each pixel to an A/D convert portion 112. The A/D convert portion 112 converts the image data into digital data, and outputs the digital data to a reading control portion 107. In the reading control portion 107, an image data packing portion 201 packs image data input from the A/D convert portion 112 into 16 bits per image data of one pixel. Then, a shading correction portion 202 and γ correction portion 203 perform shading correction and γ correction, respectively. The γ correction corrects the level of an input image signal and outputs the corrected image signal so as to print the image at a proper density. An image extraction portion 204 extracts only image data of a specific range, and an image data compression portion 205 compresses the extracted image data. The compressed image data are sequentially stored via a DMA controller 117 in a RAM incorporated in the image reading apparatus.

Recently, it is demanded to read an image at high speed. This requires an image sensor capable of reading at high speed. Such an image sensor is a line image sensor which has a length corresponding to the document width and includes a plurality of chips. This sensor is different from the above-mentioned "single output type" image sensor which serially outputs image data of pixels from one read by an element at an end. A sensor of this type is called a "multi-output type" image sensor. The "multi-output type" image sensor is configured by connecting a plurality of sensor chips into a line. The sensor chips parallel-output image data to read the image at high speed. For example, three sensor chips are arranged to parallel-output three 1-line image data. This "multi-output type" image sensor can achieve a reading speed triple that of the "single output type" image sensor.

Japanese Patent Laid-Open No. 7-298266 discloses a decoding apparatus which selects and outputs desired image data. The decoding apparatus comprises a means for determining image data when sequentially receiving coded image data having undergone two different types of processes. Since the type of image data is determined to change a subsequent process, the determination circuit is complicated.

The image data compression portion (encoding portion) 205 in FIG. 6 compresses image data in order to, for example, reduce the capacity of the RAM for temporarily storing image data. As this method, the image data compression portion 205 adopts a DPCM encoding method to compress image data of a target pixel from 16 bits into 8 bits based on a preceding pixel. Image data compression techniques include a modeling technique of modeling an image signal, and a coding technique of actually assigning a code to a signal sequence converted by the modeling technique. Examples of the modeling technique are run-length modeling, Markov modeling, and DPCM (Differential Pulse Code Modulation). As the coding technique, Huffman coding and arithmetic coding are known. Of these techniques, DPCM uses an image data feature that a given pixel value is highly likely to take a value close to an immediately preceding pixel value. DPCM is becoming popular as an image data compression technique. However, according to this compression method, image data of a preceding pixel does not exist for image data of a pixel output first from the image sensor for each line of a read image. For this reason, image data of a pixel output first from the image sensor is not compressed by the DPCM encoding method based on a preceding pixel, but is compressed from 16-bit data into 8-bit data by using upper 8-bit data out of 16-bit data of one pixel. That is, image data is compressed into compressed data [7:0]=data [15:8] before compression. Image data of succeeding pixels are sequentially compressed by the DPCM encoding method, and sequentially stored in the RAM.

The compressed image data are sequentially read out from the RAM via the DMA controller, and sequentially decompressed from 8 bits into 16 bits by an image data decompression portion in the image reading apparatus. As described above, image data of a pixel output first from the image sensor has been compressed using upper 8 bits out of image data before compression. In decompression, therefore, image data is decompressed using 8-bit data before decompression input to the decompression portion as lower 8-bit data of a 16-bit decompressed output. Image data of pixels subsequently input to the decompression portion have been compressed based on preceding pixels by the DPCM encoding method. Similarly in decompression, the data is decompressed into 16 bits based on the DPCM decoding method, that is, a preceding pixel. That is, decompression is done by changing the decompression method in decompression depending on the pixel of image data.

In a "multi-output type" image sensor, one line includes a plurality of sensor chips. To compress and decompress image data of one line, the sensor having this arrangement must hold a line memory for one line. When reading an image, image data are parallel-output from sensor chips of one line in order to increase the reading speed. As for a pixel at the boundary between sensor chips, image data of a preceding pixel has already been output from the sensor in compression, and does not exist. This is because differential coding requires a line memory for holding image data of one line.

Japanese Patent Laid-Open No. 7-298266 discloses a technique of adopting a circuit for determining the compression method of compressed image data, and executing different processes in accordance with the determination result. This technique employs a circuit which discriminates interframe image data from intraframe image data when interframe image data and intraframe image data having undergone different compression processes are sequentially input. Japanese Patent Laid-Open No. 7-298266 discloses a method of changing a processing method output at the timing when input image data is determined as intraframe image data. Note that interframe image data is image data compressed by calculating the difference between a preceding frame and the current frame. Intraframe image data is image data compressed within the current frame without calculating the difference between a preceding frame and the current frame. However, the means for determining whether input image data is interframe image data or intraframe image data undesirably complicates the circuit and raises the cost.

In an image reading apparatus using a multi-output type image sensor, it is difficult to process 1-line image data at high speed by a relatively simple circuit arrangement without newly holding a line memory in compression. In addition, no reference concretely discloses the arrangement.

SUMMARY OF THE INVENTION

The present invention has been made to overcome the conventional drawbacks, and has as its object to provide an image reading apparatus capable of a high-speed process by a relatively simple circuit arrangement without newly holding a line memory. The image reading apparatus uses a multi-output type image sensor. It is another object of the present invention to provide an image reading method for the image reading apparatus.

To solve the above-described problems, according to one aspect of the present invention, there is provided by an image reading apparatus having an image sensor in which a plurality of sensors for reading a document image are connected into a line, the document image is read line by line, and the sensors parallel-output image data. The apparatus comprises: a compression unit for compressing, by different compression methods, image data of a pixel at one end read by each sensor and image data of remaining pixels, out of image data of the document image output from the sensor; a storage unit for storing the image data compressed by the compression unit; a decompression unit for decompressing the image data output from the storage unit; a counting unit for counting the number of pixels input to the decompression unit; and a number-of-pixels setting unit arranged in the decompression unit, wherein when the number of pixels counted by the counting unit matches the number of pixels set in the number-of-pixels setting unit, a decompression method for the image data by the decompression unit is changed.

To solve the above-described problems, according to another aspect of the present invention, there is provided by an image reading method for an image reading apparatus having an image sensor in which a plurality of sensors for reading a document image are connected into a line, the document image is read line by line, and the sensors parallel-output image data. The method comprises: compressing, by different compression methods, image data of a pixel at one end read by each sensor and image data of remaining pixels out of image data of the document image output from the sensor; storing the image data compressed in the compressing in a storage unit; causing a decompression unit to decompress the image data output from the storage unit; and changing, when the number of pixels set in the decompression unit matches the number of pixels counted by a counting unit, a decompression method for the image data by the decompression unit, wherein the document image is read.

The present invention can provide an image reading apparatus using a multi-output type image sensor with a relatively simple circuit arrangement without newly holding a line memory for compression, and an image reading method for the image reading apparatus.

Further features of the present invention will become apparent from the following description of exemplary embodiments (with reference to the attached drawings).

DESCRIPTION OF THE EMBODIMENTS

A preferred embodiment of the present invention will be described in detail below with reference to the accompanying drawings.

Image data compression and decompression processes according to the present invention when a document image is read by a "multi-output type" image sensor in which three sensor chips are arranged on one line and three sensors parallel-output image data will be described with reference to FIGS. 1, 2A, and 2B.

A 1-line image sensor includes three sensor arrays, that is, a sensor array 206 at the left end, a sensor array 207 at the center, and a sensor array 208 at the right end. The image sensor reads a target document image. The sensor array means a sensor chip on which reading pixels are arranged in an array. After reading, the sensor arrays sequentially parallel-output image data to an A/D convert portion 112, as shown in FIG. 2A. Each sensor array serially outputs image data. In a compression process by an image data compression portion 205, image data of a preceding pixel (adjacent pixel) does not exist for image data 400 of a pixel output first from the sensor array 206 at the left end. For this reason, the image data 400 is compressed from 16 bits into 8 bits by using upper 8-bit data out of 16-bit data of one pixel. Image data of succeeding pixels output from the sensor array 206 after the image data 400 are compressed by the DPCM encoding method.

Image data 402 of a pixel output first from the sensor array 207 at the center should be compressed based on image data 401 of a pixel finally output from the sensor array 206 at the left end. Image data 404 of a pixel output first from the sensor array 208 at the right end should be compressed based on image data 403 of a pixel finally output from the sensor array 207 at the center. To execute this compression, the "multi-output type" image sensor must hold a line memory for one line. For example, DPCM-compressing the image data 402 of the sensor array 207 requires the image data 401 of the sensor array 206. However, the image data 401 is read at a timing earlier than that of the image data 402, so a memory area for holding the image data 402 is necessary. To perform compression without holding such an unwanted line memory, the image data 402 and 404 of the first pixels from the sensor arrays 207 and 208 are also compressed similarly to the image data 400 of the first pixel from the sensor array 206. That is, image data is compressed from 16 bits into 8 bits by using upper 8-bit image data out of 16-bit image data of one pixel. Image data of succeeding pixels are compressed by the DPCM encoding method. In FIG. 2A, a reference number 405 is last pixel data output from the sensor array 208.

A decompression process will be similarly explained with reference to FIGS. 1 and 2B.

Figure 1:
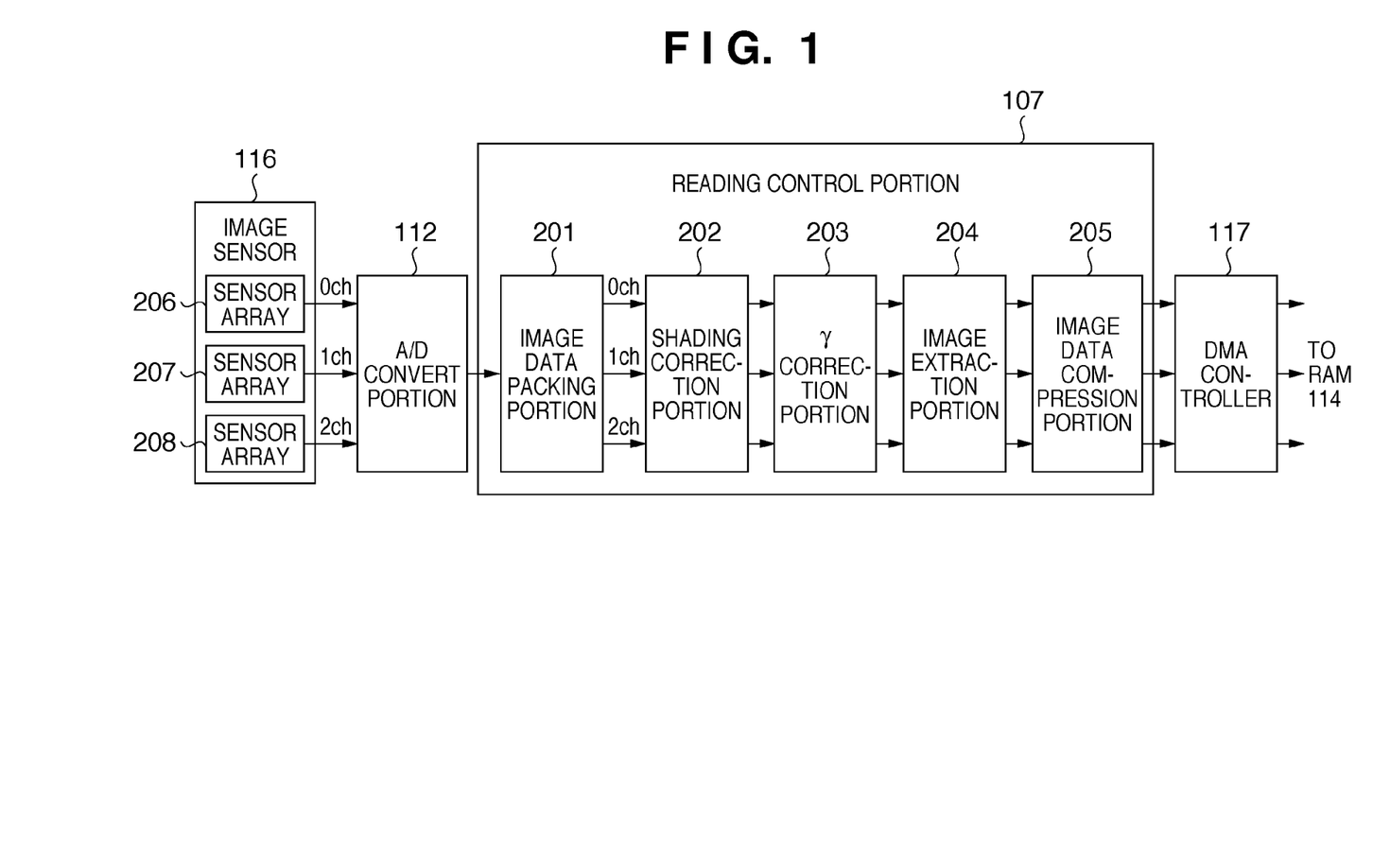
FIG. 1 is a block diagram showing the flow of image data in the reading control portion of an image reading apparatus according to the present invention.
Figure 2A:
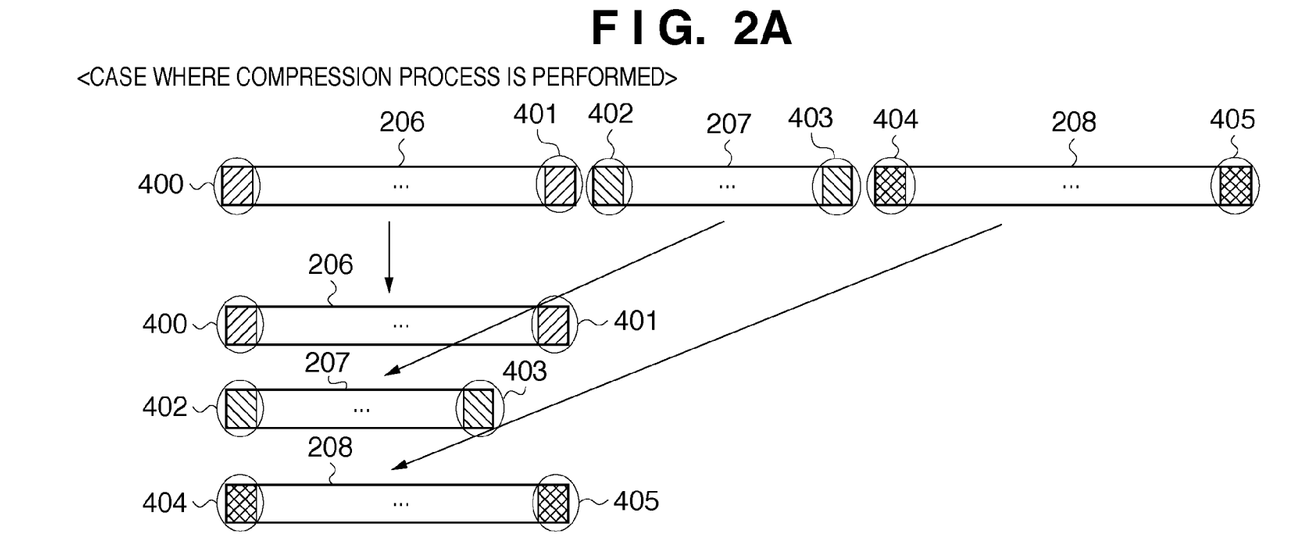
FIG. 2A is a view showing the sequence of an image data compression process by a multi-output sensor.
Figure 2B:
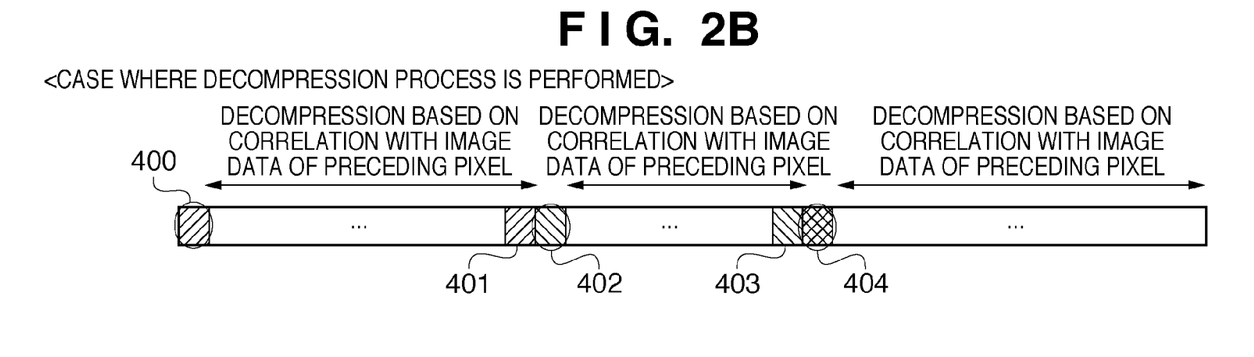
FIG. 2B is a view showing the sequence of an image data decompression process by the multi-output sensor.

Image data output from the respective sensor arrays are sequentially parallel-processed as shown in FIG. 1 while each image data is compressed into 8 bits by the image data compression portion 205 and written in the RAM via a DMA controller 117. When reading out image data from the RAM, image data of pixels for one line of a document image are rearranged in correspondence with the alignment order of pixels for one line, and then read out in consideration of a subsequent image process such as edge enhancement. Since the image data have been compressed, the data amount is small. Even holding image data of pixels for one line requires only a small memory capacity.

In decompression, image data of pixels for one line of a compressed document image are rearranged in correspondence with the alignment order of pixels for one line. Then, the image data are serially input to a decompression portion and sequentially decompressed, as shown in FIG. 2B. In the decompression process, the image data 400 serves as image data of the first pixel output from the sensor array 206. Hence, input 8-bit image data is decompressed into 16 bits as lower 8-bit image data of 16-bit decompressed image data. That is, image data is decompressed into decompressed data [15:0] = data [7:0] before decompression+data [7:0] before decompression. Image data of succeeding pixels each are sequentially decompressed into 16 bits by the DPCM decoding method.

In a "single output type" image sensor, image data of pixels other than that of the first pixel suffice to be decompressed by the DPCM decoding method. However, in a "multi-output type" image sensor, the image data 402 of the first pixel output from the sensor array 207 is compressed not based on the image data 401 of the final pixel output from the sensor array 206, but based on upper 8-bit image data out of 16-bit image data, similar to the image data 400 of the first pixel output from the sensor array 206. Thus, the image data 402 is decompressed similarly to the image data 400.

At the timing when the image data 402 is input to the decompression portion, the current decompression process based on the DPCM decoding method is temporarily changed, and then restored. This also applies to the image data 404. In other words, when decompressing image data of pixels for one line of a compressed document image, the decompression processing method for image data of each pixel changes depending on the compression method for image data of each pixel in an intermediate decompression process for image data.

Figure 3:
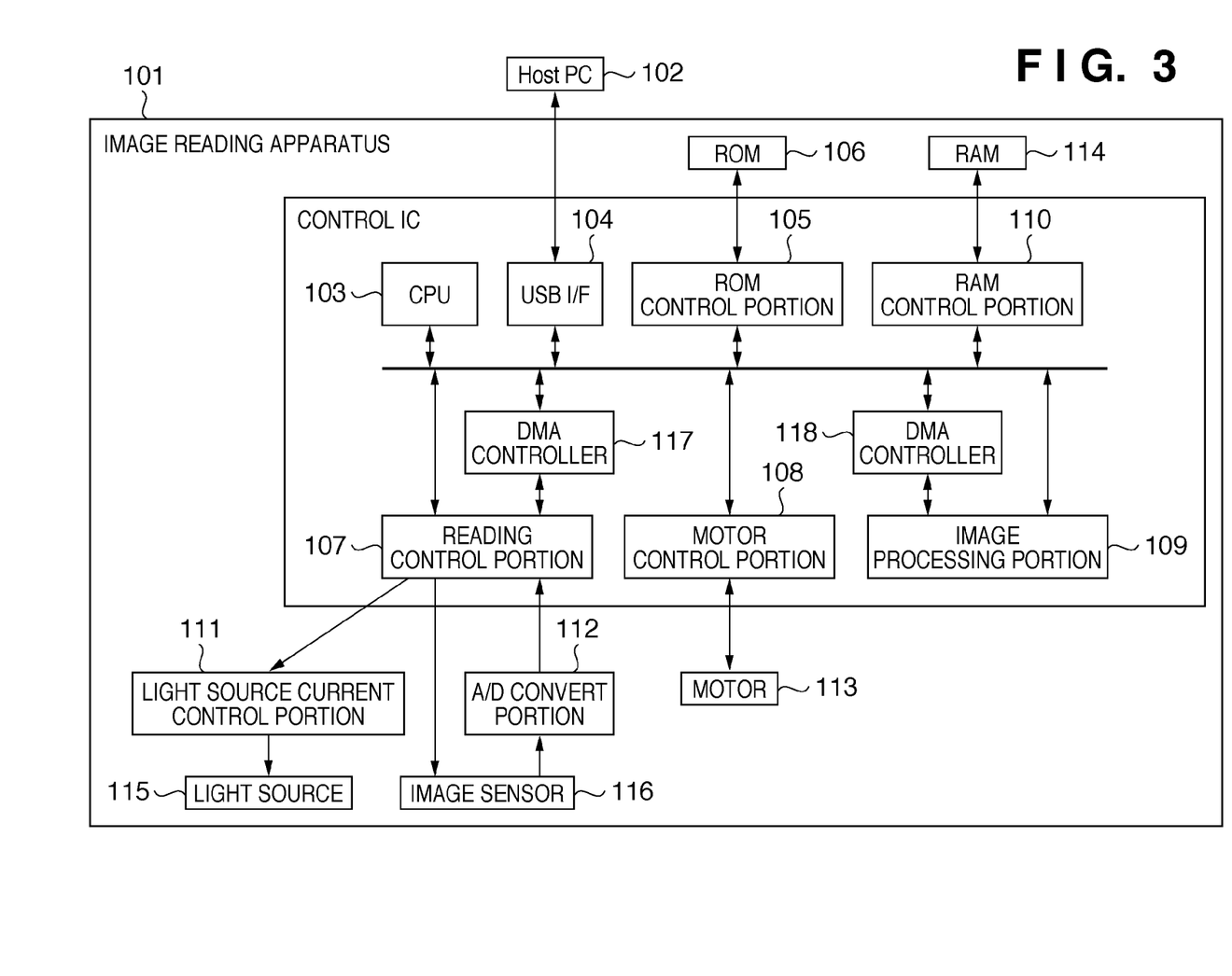
FIG. 3 is a block diagram showing the overall arrangement of an image reading apparatus according to an embodiment of the present invention.

FIG. 3 is a block diagram showing the overall arrangement of an image reading apparatus 101 to which the present invention is applicable.

A main CPU 103 controls the whole system. The main CPU 103 reads out a control program stored in a ROM 106 via a ROM control portion 105, and executes it. A RAM 114 serves as a work area for the CPU 103 and a storage portion for storing read image data. Write/read in/from the RAM 114 is done via a RAM control portion 110. A motor control portion 108 controls a motor 113 of the image reading apparatus. A reading control portion 107 controls reading of image data. The reading control portion 107 sends an ON/OFF control signal for a light source 115 to a light source current control portion 111. Based on the ON/OFF control signal, the light source 115 is turned on/off with a proper current value via the light source current control portion 111. The light source 115 irradiates a document to be read with light. A charge storage image sensor 116 photoelectrically converts reflected light from the document, and stores an image signal. The reading control portion 107 sends a line sync signal to the image sensor 116, and the image sensor 116 sequentially outputs image signals based on the line sync signal. An A/D convert portion 112 converts the image signals output from the image sensor 116 into digital data, and transfers the digital data to the reading control portion 107. The read image data are processed by the reading control portion 107, and stored in the RAM 114 via the DMA controller 117. The image data are sequentially read out from the RAM 114 via a DMA controller 118, processed by an image processing portion 109, and sequentially transferred to a host PC 102 via a USB device I/F 104.

Details of the reading control portion 107 will be explained with reference to FIG. 1. The A/D convert portion 112 converts, into digital data, image data read by the image sensor 116 divided into the three areas of the sensor arrays 206, 207, and 208, as shown in FIG. 2A. The A/D convert portion 112 transfers the digital data to the reading control portion 107. An image data packing portion 201 packs digital data serially input from the A/D convert portion 112 into 16-bit data for each pixel. At the same time, the image data packing portion 201 distributes image data parallel-output from the respective sensor arrays (sensor chips) to respective data processing channels 0ch, 1ch, and 2ch in the reading control portion 107. The image data distributed to the respective channels are sequentially input to a shading correction portion 202 and γ correction portion 203, which perform a shading correction process and γ correction process, respectively. An image extraction portion 204 extracts only image data of a desired range, and an image data compression portion (encoding portion) 205 compresses the extracted image data in order to reduce the capacity of the RAM 114. The compressed image data are sequentially stored in the RAM 114 via the DMA controller 117.

The compressed image data stored in the RAM 114 are sequentially read out via the DMA controller 118 in an order corresponding to the alignment order of pixels for one line of a document image, and serially input to the image processing portion 109. The image processing portion 109 sequentially decompresses the image data compressed by the image data compression portion 205, performs various image processes, and transfers the processed image data to the host PC 102.

Figure 4:
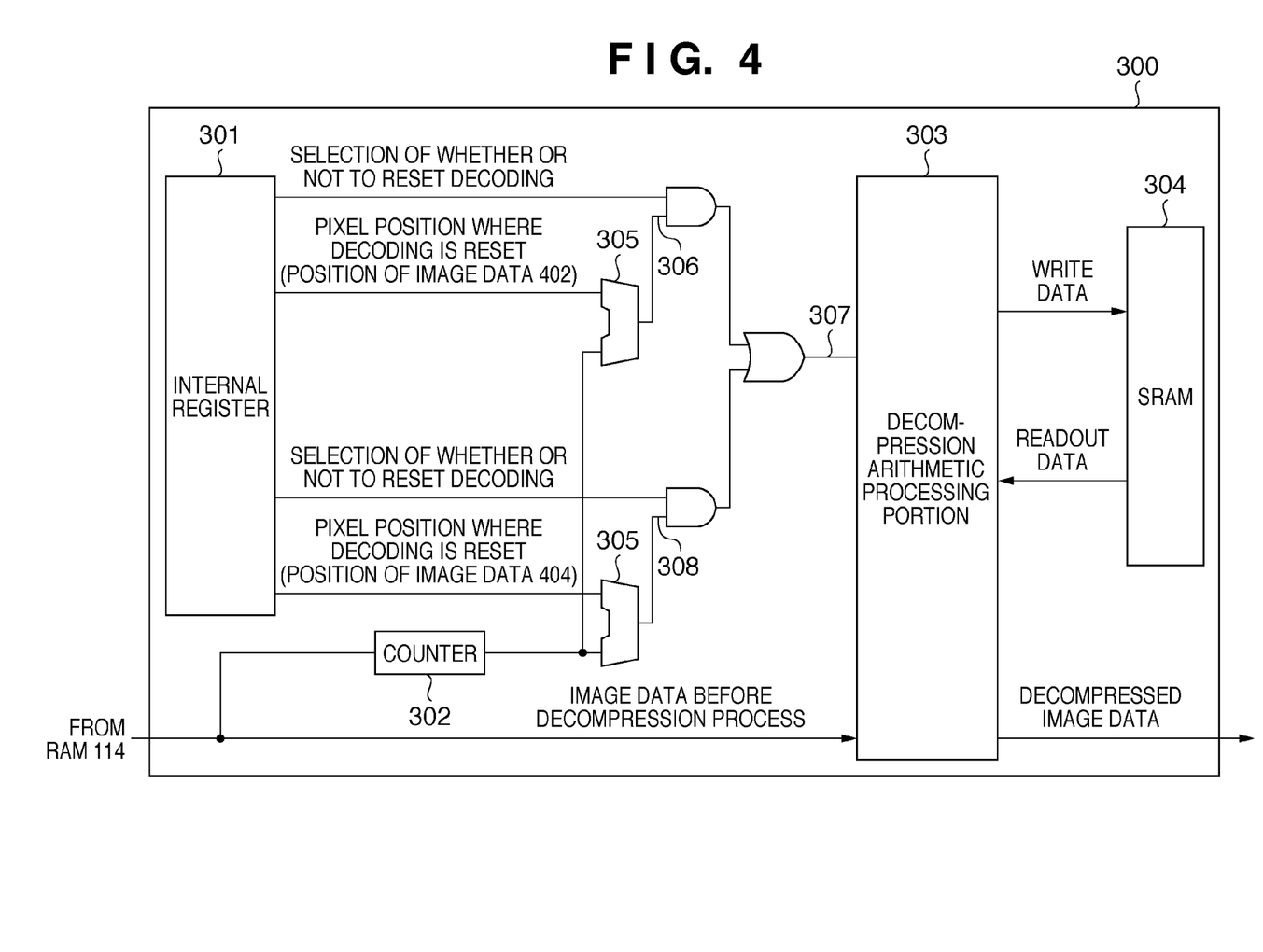
FIG. 4 is a view showing the arrangement of an image data decompression portion in the image reading apparatus according to the embodiment of the present invention.

The sequence of the decompression process by the image processing portion 109 will be described in detail with reference to FIG. 4.

The number of pixels is set in an internal register 301 of an image data decompression portion 300 in the image processing portion 109. More specifically, (1) the number of pixels starting from the pixel data 400 output first from the sensor array 206 at the left end up to the pixel data 402 output first from the sensor array 207 at the center is set as the first number of pixels. Similarly, (2) the number of pixels starting from the pixel data 400 output first from the sensor array 206 at the left end up to the pixel data 404 output first from the sensor array 208 at the right end is set as the second number of pixels. At the same time, (3) it is set to either "change" or "not change" the data decompression method at the timings when the number of pixels reaches the first and second set numbers of pixels. In the embodiment, it is set to reset the DPCM decoding method at these timings. The image data decompression portion 300 incorporates a counter 302 which counts the number of serially input image data for each pixel. The counter 302 counts the number of pixels from sequentially input image data.

The image data 400 of a pixel first input to the internal register 301 has been compressed from 16 bits into 8 bits by using upper 8 bits out of 16-bit image data before compression. For this reason, the 8-bit image data are first serially input from the RAM 114 to the image data decompression portion 300. The image data are decompressed into 16-bit image data by a decompression arithmetic processing portion 303 as lower 8-bit image data out of 16-bit decompressed image data. Subsequently input image data each are sequentially decompressed into 16 bits by the decompression arithmetic processing portion 303 according to the DPCM decoding method, and the decoded image data are output. Every time image data are decompressed according to the DPCM decoding method, image data of a preceding pixel is saved in an SRAM 304 and read out to perform the DPCM decoding process. Simultaneously when the decompression arithmetic processing portion 303 performs the decompression process, the counter 302 sequentially counts the number of pixels from input image data.

The image data decompression portion 300 incorporates a comparison circuit 305 which compares the number of pixels counted by the counter 302 with the first number of pixels set in the internal register 301. When the counted number of pixels matches the first number of pixels, a match detection signal 306 is output at the timing when they match each other. When it is set in the internal register 301 to reset decoding based on the DPCM decoding method, a logical operation with the match detection signal 306 is performed. Then, a reset signal 307 is output to the decompression arithmetic processing portion 303 to reset decoding based on the DPCM decoding method. At the timing when the reset signal 307 is output, the decompression arithmetic processing portion 303 resets decoding based on the DPCM decoding method. That is, the image data 402 input to the image data decompression portion 300 at this timing undergoes a decompression process other than one based on the DPCM decoding method. More specifically, compressed image data is decompressed into 16-bit image data as lower 8-bit image data out of 16-bit decompressed image data. Image data of succeeding pixels each are sequentially decompressed into 16 bits by the DPCM decoding method again.

Similarly, the comparison circuit 305 compares the number of pixels counted by the counter 302 with the second number of pixels set in the internal register 301. When the counted number of pixels matches the second number of pixels, a match detection signal 308 is output at the timing when they match each other. When it is set in the internal register 301 to reset decoding based on the DPCM decoding method, a logical operation with the match detection signal 308 is performed. Then, the reset signal 307 is output to the decompression arithmetic processing portion 303 to reset decoding based on the DPCM decoding method. At the timing when the reset signal 307 is output, the decompression arithmetic processing portion 303 resets decoding based on the DPCM decoding method. The image data 404 input to the image data decompression portion 300 at this timing undergoes a decompression process other than one based on the DPCM decoding method. More specifically, compressed image data is decompressed into 16-bit image data as lower 8-bit image data out of 16-bit decompressed image data. Image data of succeeding pixels each are sequentially decompressed into 16 bits by the DPCM decoding method again.

After all compressed image data of pixels for one line are decompressed, and the next compressed image data of pixels for one line are input to the image data decompression portion 300, the counter 302 is cleared. The newly input image data of pixels for one line are also sequentially decompressed in the same way as that described above.

Figure 5:
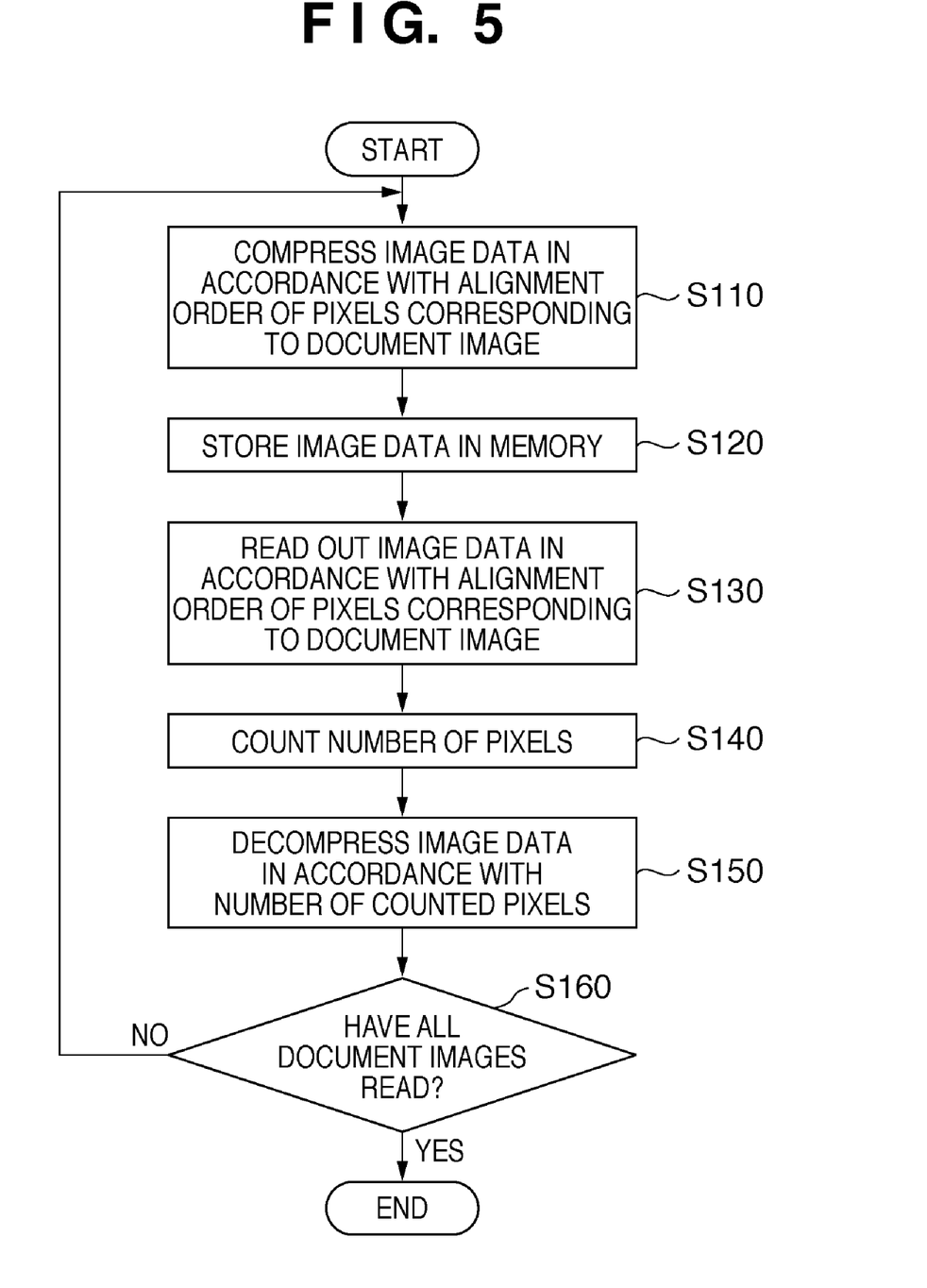
FIG. 5 is a flowchart showing an example of an image reading method according to the present invention.

An example of an image reading method according to the present invention will be explained with reference to the flowchart of FIG. 5.

In step S110, image data of a 1-line document image output from the respective sensor arrays are compressed by different compression methods in accordance with the alignment order of pixels for one line of the document image. More specifically, image data of pixels at one end read by the respective sensor arrays, and image data of the remaining pixels are compressed by different compression methods. In step S120, the compressed image data are stored in the memory. In step S130, the compressed image data are serially read out from the memory in correspondence with the alignment order of pixels for one line of the document image. In step S140, the number of pixels corresponding to the image data read out in step S130 is counted. In step S150, the image data read out by the reading portion are decompressed by a plurality of types of decompression methods corresponding to the plurality of types of compression methods in accordance with the number of pixels counted in step S140. This process is repeated till the end of reading the target document image (step S160).

The arrangement of the image reading apparatus according to the present invention adopts a multi-output type image sensor, and can change the decompression method into a method designated at a designated timing. By using only counting by the counter, and a simple circuit arrangement for only selecting whether or not to select a set processing method, the image reading apparatus can execute compression and decompression processes without newly arranging a data holding line memory for data compression. When the number of pixels at which decoding based on the DPCM decoding method is reset can be arbitrarily set, the present invention can be applied regardless of the specifications of an image sensor. The present invention can also be applied to even a case where the number of pixels to be processed changes, for example, a case where an image of a desired range is extracted from original image data. When a plurality of numbers of pixels at which decoding based on the DPCM decoding method is reset can be set, the present invention can be applied to even more than three parallel-output image sensors (e.g., five or six parallel-output image sensors). When the user can set whether or not to reset the decompression method, the present invention can be applied to even less than three parallel-output image sensors (e.g., two parallel-output image sensors).

Note that the present invention can be applied to an apparatus comprising a single device or to a system constituted by a plurality of devices.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-203402, filed Aug. 3, 2007, and Japanese Patent Application No. 2008-187914, filed Jul. 18, 2008, which are hereby incorporated by reference herein in their entirety.

What is claimed is:

1. An image reading apparatus having an image sensor in which a plurality of sensors for reading a document image are arranged into a line, the apparatus comprising:

a compression unit configured to compress image data of a pixel at one end read by each sensor in the image sensor by a first compression process and to compress image data of remaining pixels in the each sensor in the image sensor by a second compression process different from the first compression process;

a storage unit configured to store the image data compressed by said compression unit;

a decompression unit configured to decompress the image data output from said storage unit; and a counting unit configured to count the number of pixels input to said decompression unit;

wherein when the number of pixels counted by said counting unit matches a predetermined number, said decompression unit changes a decompression process for the image data stored by said storage unit between a first decompression process for the image data compressed by the first compression process and a second decompression process for the image data compressed by the second compression process.

2. The apparatus according to claim 1, further comprising a control unit configured to read out, in an order corresponding to an alignment order of pixels for one line of the document image, image data of each sensor that are stored in said storage unit, and serially inputting the image data to said compression unit.

3. The apparatus according to claim 1, wherein said compression unit compresses the image data of the pixel at one end of each sensor on the basis of the image data of the pixel, and compresses the image data of the remaining pixels on the basis of previously read image data of adjacent pixels.

4. The apparatus according to claim 1, wherein said decompression unit comprises a decompression process selection unit capable of setting a plurality of decompression processes and setting whether to select each decompression process.

5. The apparatus according to claim 1, wherein said decompression unit decompresses the image data of the pixel at one end of each sensor on the basis of the image data of the pixel, and decompresses the image data of the remaining pixels on the basis of previously read image data of adjacent pixels.

6. An image reading method for an image reading apparatus having an image sensor in which a plurality of sensors for reading a document image are arranged into a line, the method comprising:

compressing image data of a pixel at one end read by each sensor in the image sensor by a first compression process and compressing image data of remaining pixels in the each sensor in the image sensor by a second compression process different from the first compression process;

storing the image data compressed in the compressing in a storage unit;

decompressing the image data output from the storage unit in accordance with a first decompression process for the image data compressed by the first compression process and a second decompression process for the image data compressed by the second compression process;

counting the number of pixels output from the storage unit; and changing, when the counted number of pixels matches a predetermined number, a decompression process for the image data stored in the storage unit between the first decompression process and the second decompression process.

7. The apparatus according to claim 1, further comprising a setting unit configured to set the number of pixels used for reading the document in each of the sensors in the image sensor, wherein said decompression unit changes the decompression process when the number of pixels counted by said counting unit matches the number of pixels set by setting unit.

* * * * *